United States Patent [19]

Koga

[11] Patent Number: 4,710,810
[45] Date of Patent: Dec. 1, 1987

[54] PREDICTIVE CODING/DECODING APPARATUS FOR VIDEO SIGNAL

[75] Inventor: Toshio Koga, Tokyo, Japan

[73] Assignee: NEC Corporation, Japan

[21] Appl. No.: 708,272

[22] Filed: Mar. 5, 1985

[30] Foreign Application Priority Data

Mar. 6, 1984 [JP] Japan .................................. 59-42306

[51] Int. Cl.$^4$ ........................... H04N 7/12; H04B 1/66
[52] U.S. Cl. .................................... 358/133; 358/135; 358/138; 375/122
[58] Field of Search ............... 358/105, 133, 135, 136, 358/138; 375/122

[56] References Cited

U.S. PATENT DOCUMENTS

| 4,070,694 | 1/1978 | Sakamoto et al. | 358/138 X |
| 4,307,420 | 12/1981 | Minomiya et al. | 375/27 X |
| 4,371,895 | 2/1983 | Koga | 358/136 |
| 4,460,923 | 7/1984 | Hirano et al. | 358/138 X |
| 4,533,957 | 8/1985 | Iinuma | 358/135 X |

Primary Examiner—E. A. Goldberg
Assistant Examiner—Patrick W. Foster
Attorney, Agent, or Firm—Ostrolenk, Faber, Gerb & Soffen

[57] ABSTRACT

A video signal compression circuit for encoding a video signal to reduce the quantity of video information that is transmitted without loss of information and a video signal decompressing circuit for recovering the video signal from its compressed coded form. The encoding circuit includes means for detecting the motion contained in the video signal to generate motion vectors which are representative of this motion. Each picture frame produced from the transmitted video signal is divided into many block units. The motion vectors are generated according to the order of the block units rather than according to the order in which the video signal is transmitted. Thereafter, the vectors are reconverted to the order of the input video signal. The input video signal and the converted motion vectors are used for generating a prediction error signal which indicates motion in the video signal. The prediction error signal is encoded using a variable length coding scheme. On the receiving end, a decoding circuit is used for reproducing the original video signal. The decoding circuit includes means for decoding the output of the coding means on the transmitter side to reproduce the prediction error signal. The reproduced prediction error signal is converted into an appropriate time sequence which matches that of the input video signal and then the input video signal is reproduced in response to the reconverted prediction error signal and the motion vectors which are received from the transmitter.

14 Claims, 7 Drawing Figures

PREDICTIVE CODING/DECODING APPARATUS FOR VIDEO SIGNAL

BACKGROUND OF THE INVENTION

The present invention relates to a coding technique of a video signal, and more particularly to a predictive coding apparatus and a decoding apparatus therefor capable of compressing the amount of information by relying upon a timing correlation of the signal.

A coding method utilizing a correlation in the direction of a time axis has heretofore been well known for its high efficiency. An example may be an inter-frame coding apparatus for a television signal. According to the inter-frame coding apparatus which codes a difference between two sequential picture frames, however, the coding efficiency inevitably decreases as the motions contained in the television signal increases. To overcome this difficulty, there has been developed a motion-compensated inter-frame coding method in which the motion in the video signal is detected and accounted for in the prediction. The apparatus utilizing such motion-compensation has been disclosed in, for example, U.S. Pat. No. 4,371,895 entitled "Coded Video Signal Transmitting and Receiving System". The attention of the reader is also drawn to U.S. patent application Ser. No. 656,147 which is also related to the subject matter of the present invention.

In a predicting operation according to the motion-compensation method, a motion vector that represents a speed and a direction of the motion between two sequential frames is initially detected, and, then, a prediction signal is obtained by shifting a preceding signal in accordance with the detected motion vector so as to code a present video signal with it. When the motion vector thus detected accurately represents the actual motion of the moving portion in the video signal, a prediction error signal, associated with the coding operation, ideally becomes zero, making it possible to compress the amount of information transmitted even for a video signal which contains motion. In practice, however, the prediction error signal does not become completely zero; i.e., it often has a non-zero value near the contour of a moving portion of a television frame.

In a motionless (still) portion of a picture, the motion vector for that portion would indicate that there is no movement. The coding operation in this latter case corresponds to the so-called conventional inter-frame coding system.

The thus obtained prediction error signal and the motion vector are subjected to variable length coding prior to being transmitted. The prediction error signal does not develop much in a video signal, which contains very little movement and less complex patterns, such as is obtained during a television conference. Further, the prediction error signal has spatial (two-dimensional) correlation, which can be advantageously utilized to subject them to the variable-length coding. To date, however, the variable length coding has been conventionally effected based on using units of one scanning line at a time. For instance, to efficiently code a prediction error signal of zero value, the run-length coding had been employed, and to code the more significant prediction error signal when it is not at zero, the Huffman coding had been employed. As is known, the prediction error signal of one scanning line could be subjected to coding by combining these coding schemes.

On the other hand, the motion vector is generally detected using two-dimensional block units each spanning across a plurality of scanning lines. Often the same vector values are detected for several neighboring blocks. The difference between the motion vectors of the neighboring blocks, in many cases, therefore produce a result of zero. To date, however, the fact that zero is frequently and continuously obtained had not been taken advantage of. Consequently, an overall improved efficiency which relies upon the motion compensation had not been achieved.

SUMMARY OF THE INVENTION

Therefore, it is an object of the present invention to provide a predictive coding/decoding apparatus capable of efficiently coding a video signal by using spatial correlations of not only a prediction error signal but also a motion vector.

According to the present invention, there is provided an apparatus for predictively coding and decoding a video signal, wherein: on a transmitting end, a motion vector contained in an input video signal is detected for each of several block units each of which include a plurality of picture elements which spans a plurality of scanning lines; the motion vector is time-sequentially converted to match the time sequence of the input video signal; a prediction error signal is obtained in response to the input video signal and the converted motion vector; the prediction error signal is time-sequentially converted to have a higher correlation; and the converted prediction error signal is coded by variable length coding including run-length coding and is then transmitted.

On a receiving end, the converted prediction error signal is decoded; the converted prediction error signal is rearranged into the time sequence of the input video signal; and a video signal is predictively decoded in response to the rearranged prediction error signal and a motion vector which is transmitted from the transmitting side.

DESCRIPTION OF THE PREFERRED EMBODIMENT OF THE INVENTION

Figure 1:
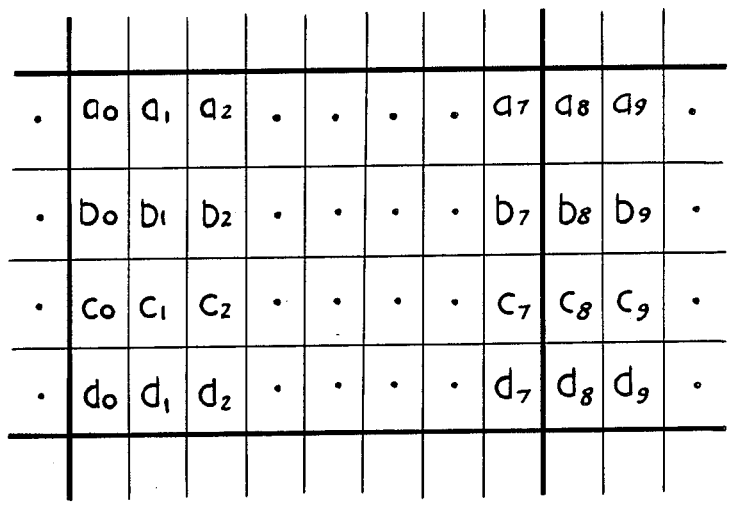
FIG. 1 is a diagram for explaining a scanning conversion.

To aid in understanding of the invention, the principle of the present invention is described first. When a video signal containing little motion, such as a video signal from a television conference, is to be transmitted at a rate of about 1.5 Mb/S, coding is so controlled that only relevant picture elements are generated. The relevant picture elements are, at most, several percents, on the average, of the total video data. In other words, about 97 to 98% components of a prediction error signal are zero. When the proportion of the prediction error signal of zero values is overwhelming, the efficiency of run-length coding can be increased in accordance with the increase in the run-length. If the coding is effected for each of the scanning lines in a manner of . . . $a_0, a_1, a_2, \ldots, a_7, a_8, a_9, \ldots, b_0, a_1, \ldots, b_7, b_8, b_9, \ldots$, (time series A) as shown in FIG. 1, the maximum run length is limited to the number of picture elements on one scanning line. Contrarily, if a plurality of scanning lines, for example, N lines are coded at one time, the maximum run length is increased by N times. When a plurality of scanning lines of each of several blocks are to be coded as a unit at one time, picture elements should be successively scanned in a manner of $a_0, a_1, \ldots, a_6, a_7, b_0, b_1, b_2, \ldots, b_6, b_7, c_0, c_1, \ldots, d_0, d_1, \ldots, d_6, d_7, a_8, a_9, \ldots$ (time series B) in the case of the picture element arrangement of FIG. 1. Note that the "block" to which the above series of picture elements relates is bounded by the thickened lines of FIG. 1. In any event, in this case, after the scanning of one block is completed, the scanning of the next block should be continued in the manner as above. Therefore, N lines (N=4 in this embodiment) are coded at one time.

Generally, since a video signal has a high time-correlation as well as a high spatial-correlation, the significant prediction error signal which is not equal to zero is generally spatially concentrated. That is, significant picture elements are located in a small portion except of a majority proportion (97 to 98% in the above description) of the zero prediction error. Therefore, if two dimensional blocks are designated as shown in FIG. 1, a number of blocks are entirely located in a region at which the prediction error signal has a value of zero. For instance, let it be assumed that m blocks each consisting of M picture elements $\times$ N lines are contained in the region, there will be N runs each formed by m$\times$M according to time series A. According to time series B, on the other hand, there will be a single run formed by m$\times$M$\times$N.

When the run length is represented by the modified Huffman (MH) code that is standardized according to CCITT, if the run length is increased by four times, i.e., increased from 50 to 200, the code length increases from 8 bits to 17 bits, i.e., the code length is merely doubled. If four runs are formed each having a length of 50, the required number of bits will be 8$\times$4=32 which is roughly twice the number of bits required to the run having the length of 200. In coding the runs, therefore, it is advantageous to decrease the number of runs and to increase their lengths. It should be noted that other scanning conversion methods can be applied to the present invention. For example, in FIG. 1, $a_0, b_0, c_0, d_0, a_1, b_1, c_1, d_1, \ldots, a_7, b_7, c_7, d_7, a_8, b_8, c_8, d_8, \ldots$, and $a_0, a_1, b_0, c_0, b_1, a_2, \ldots$, can be used.

It will be understood from the above description that the chain of zero as can be lengthened by rearranging the prediction error signal thereby to increase the efficiency for compression coding. The prediction error signal which is not zero can be efficiently processed by using the variable length code such as the Huffman code.

Figure 2:
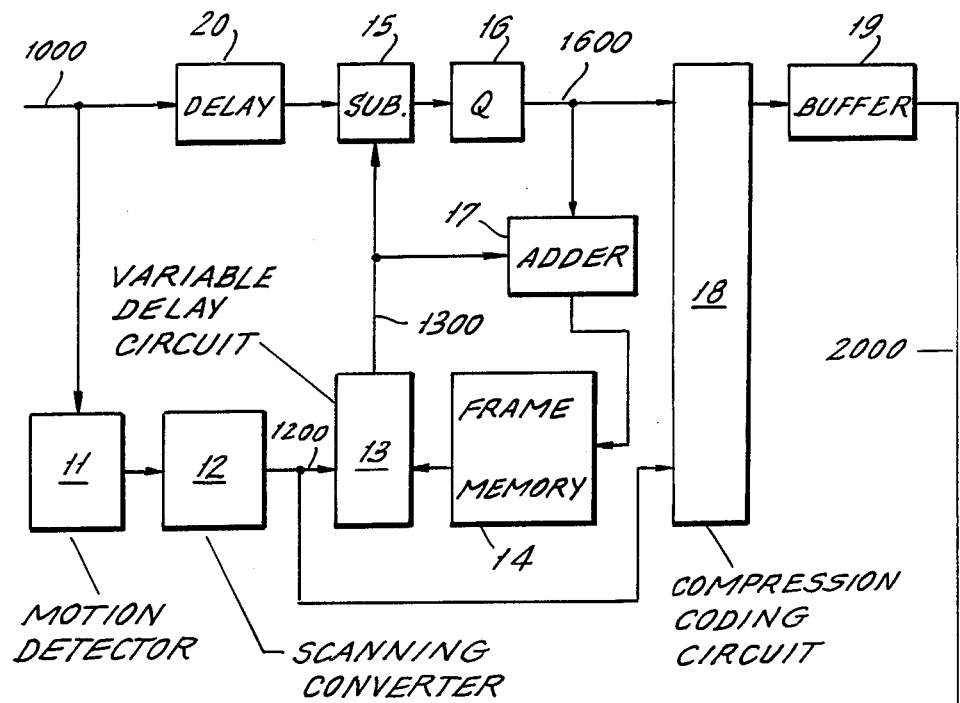
FIG. 2 shows an embodiment of an encoding circuit and a decoding circuit, according to the present invention.
Figure 2:
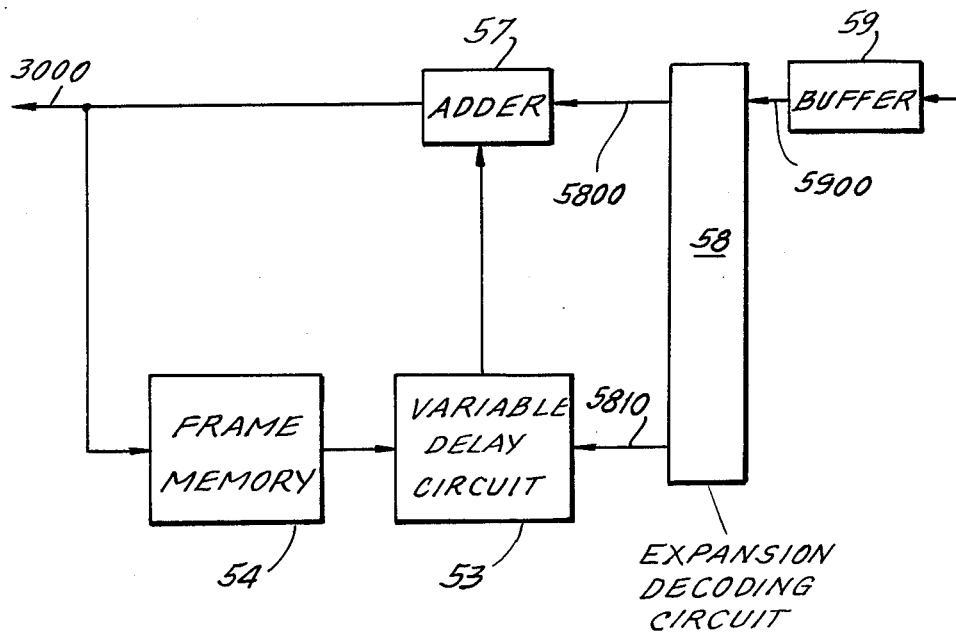

The invention will be described below in detail by reference to the drawings. FIG. 2 shows a coding/decoding apparatus according to an embodiment of the present invention. In a transmitting end (a coding apparatus), an input digital video signal is supplied through a line 1000 to a delay circuit 20 and to a motion vector detecting circuit 11 where a motion vector is detected with respect to each block unit. The motion vector detecting circuit 11 will be described later in detail.

The motion vector detected for each of the blocks is rearranged in a rearranging circuit 12 so as to be in conformity with the same time series A as the input video signal supplied via the line 1000. Then it is supplied to a variable delay circuit 13 and to a compression coding circuit 18 via a line 1200. Responsive to the motion vector, the variable delay circuit 13 generates a prediction signal in which the motion is compensated by varying the delay of a video signal delivered from a frame memory 14. The prediction signal is supplied to a subtractor 15 and to an adder 17 via a line 1300. The subtractor 15 produces a difference between the video signal produced by the variable delay circuit 13 and the input video signal delivered from a delay circuit 20. The delay circuit 20 equalizes the time of the input video signal to that of output delivered from the rearranging circuit 12. The difference from the subtractor 15 is supplied to a quantizer 16 as a prediction error signal.

The quantizer 16 quantizes the prediction error signal and supplies it to the adder 17 and to the compression coding circuit 18 via a line 1600. The adder 17 generates a local decoded signal in response to the quantized prediction error signal and the prediction signal supplied via the line 1300. The local decoded signal is supplied to the frame memory 14 which stores about one frame of the video signal.

When the motion vector indicates a stationary picture, i.e., a motionless condition, the sum of delay times of the frame memory 14 and the variable delay circuit 13 is just equal to one frame period, with the assumption that there is no delay in the subtractor 15, the quantizer 16 and the adder 17.

In the novel compression coding circuit 18 of the present invention, the prediction error signal supplied via line 1600 and the motion vector are coded and synchronizing data and control data is appended to them using a variable length coding such as the Huffman code, for example. This will be described later in detail. The coded signals delivered from the compression coding circuit 18 are then supplied to a buffer memory 19 which produces a transmission speed for the coded signals which matches the transmission speed of a transmission line 2000. Here, a recording medium such as magnetic or optical recording medium, instead of the transmission line 2000 may be used. In the following description it is assumed that the signals are transmitted on the transmission line 2000.

On a receiving end (decoding apparatus), the prediction error signal and the motion vector, etc., that have been compressed and transmitted, are first stored in a buffer memory 59 to match their speed, to the data rate of an expansion decoding circuit 58. The expansion decoding circuit 58 will be described later in detail with reference to other Figures. The expansion decoding circuit 58 performs a reverse operation to that in the compression coding circuit 18, in order to reproduce the motion vector, the quantized prediction error signal, the synchronizing data and the control data as it existed before it was compressed and coded. The reproduced prediction error signal is supplied to an adder 57 via a line 5800, and the motion vector is supplied to a variable delay circuit 53 via a line 5810. Depending upon the motion vector at line 5810, the variable delay circuit 53 varies a delay time of a video signal delivered from a frame memory 54 to generate a prediction signal, and supplies it to the adder 57. The variable delay circuit 53 may be constructed in the same manner as the variable delay circuit 13 of the transmitting side. In response to the prediction signal and the prediction error signal at line 5800, the adder 57 produces a decoded video signal and supplies it to the frame memory 54 and also externally via a line 3000. As in the transmitting end (coding apparatus), the sum of delay of the frame memory 54 and the variable delay circuit 53 is just equal to one frame time for stationary video signal, i.e., it is equal to one frame period when there is no motion, provided there is no delay in the adder 57.

Figure 3:
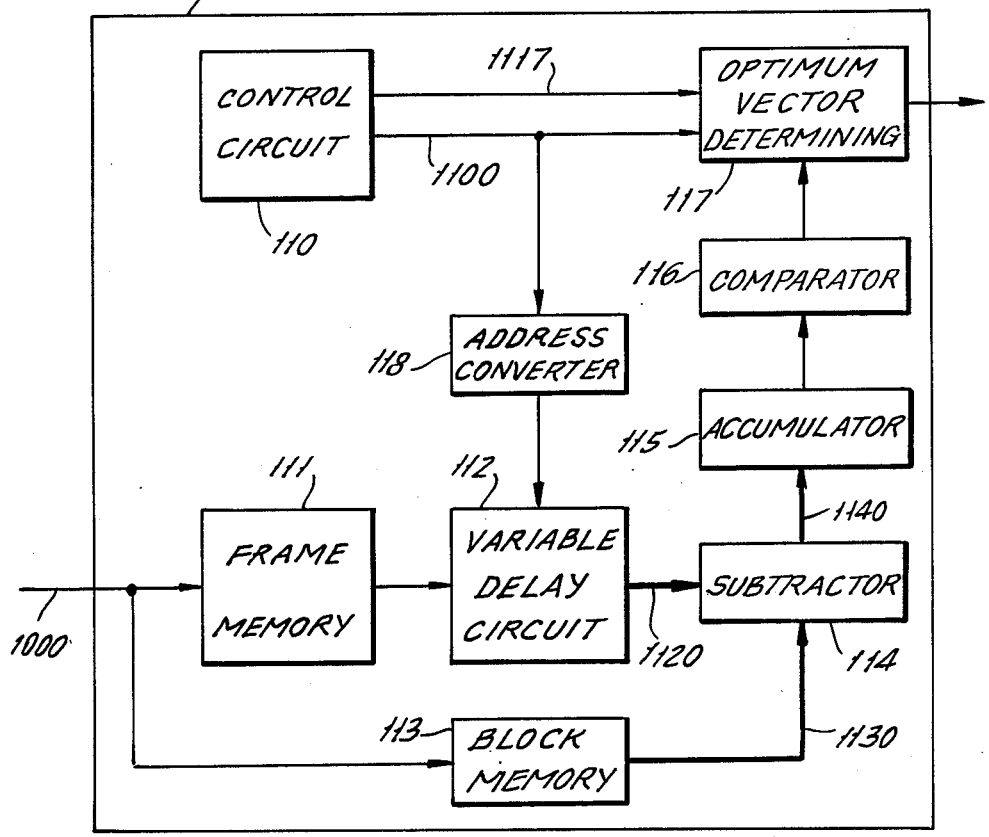
FIG. 3 is a diagram showing a motion vector detecting circuit of FIG. 2.

The motion vector detecting circuit 11 will be described below in detail by reference to FIG. 3. In FIG. 3, the input video signal supplied via the line 1000 is supplied to a frame memory 111 which is capable of storing about one frame period, and is supplied to a block memory 113 which effects the scanning conversion from the time series A to the time series B. A motion detection control circuit 110 successively produces trial vectors via a line 1100, and supplies them to an address converter circuit 118 and an optimum vector determining circuit 117. The address converter circuit 118 generates a memory address in which the block position is spatially displaced by an amount of the trial vector that is supplied, and sends the memory address to a variable delay circuit 112. If it is assumed that the trial vector is zero, the sum of delay times of the frame memory 111 and the variable delay circuit 112 is just equal to one frame period.

The video signal in the block that is spatially displaced by an amount of the trial vector is supplied to a subtractor 114 via a line 120. This signal is subjected to the subtraction with respect to a video signal supplied from the block memory 113 via a line 1130.

The block memory 113 has two memories each of which covers N lines. While moving video signals input via the line 1000 are being written on one memory in accordance with the time series A, the video signals are read out from the other memory in accordance with the time series B and are produced via the line 1130. Further, the reading operation and the writing operation are switched after every N lines.

The result of subtraction is supplied to an accumulator 115 via a line 1140. The accumulator 115 accumulates the differential amount of each block for any trial vector, and sends it to a comparator circuit 116. The comparator circuit 116 compares the accumulated results for each successive trial vector and generates a switching signal so that a trial vector that generated the smallest accumulated result is temporarily selected and stores as a temporary optimum vector in an optimum vector determining circuit 117. The optimum vector determining circuit 117 temporarily stores the trial vector indicated by the switching signal, and produces a temporary optimum vector that is held at a predetermined timing point for each block supplied through the line 1117, as the detected result (i.e. the motion vector) of the optimum vector determining circuit 117. This output is supplied to the rearranging or scan converter circuit 12 shown in FIG. 2. The variable delay circuit 112 can be constructed in the same manner as the variable delay circuit 13 in the coding circuit or as the variable delay circuit 53 in the decoding circuit.

The data is written into the variable delay circuit 112 according to the raster scanning (time series A), and is read out in block units, i.e., it is read out according to the time series B after having effected the scanning conversion explained with reference to FIG. 1. However, when it becomes difficult to calculate the moving data in real time due to logic circuit element speed limitations, the variable delay circuit 112 and the block memory 113 should be constructed as to produce outputs in parallel, and the subtractor 114 and the accumulator 115 should also be able to receive inputs and to perform calculation in parallel. This makes it possible to carry out the necessary calculations at the required high speed.

Next, the compression coding circuit 18 and the expansion decoding circuit 58 will be explained below in conjunction with FIGS. 4 and 5. In the compression coding circuit 18 shown in FIG. 4, the prediction error signal and the motion vector are subjected to the variable length coding including run-length coding. The prediction error signal supplied at line 1600 is rearranged into the time series B by a scanning converter 181 and is then supplied to the variable length coder 182. That is, after the prediction error signal is converted into the time series B that corresponds to the block arrangement with which the motion vectors are detected, it is then coded. The variable length coder 182 subjects the prediction error signal that is zero to the run-length coding, and subjects the amplitude of prediction error signal that is not zero to the variable length coding. The coded results can be properly decoded if runs of each of the lengths and the codes that represent each of the amplitude are so formed as to be distinguishable over each other. It is therefore possible to effect the run-length coding and the variable length coding for amplitude that is not zero, simultaneously.

The motion vector supplied via the line 1200 follows the time series A. Since each block has only one data (one motion vector), utilizing this property, a differential circuit 184 produces a difference between the motion vectors of neighboring blocks and supplies it to a variable length coder 185. Outputs of the variable length coders 182 and 185 are supplied to a multiplexer 183 where they are multiplexed according to a predetermined order, and additional data such as synchronizing data, etc. that are necessary for the decoding are appended to them. The multiplexed data delivered from the multiplexer 183 is supplied as the output of the compression coding circuit 18 to the buffer memory 19 via a line 1800.

The expansion decoding circuit 58 on the receiving end performs a reverse operation to that of the compression coding circuit and expands the prediction error signal and the motion vector. That is, the output of the buffer memory 59 is supplied to a demultiplexer 583 via a line 5900 and is separated into the prediction error signal, the motion vector and the synchronizing data.

The separated prediction error signal and the motion vector are supplied to variable length decoders 582 and 585 where they are expanded by variable length decoding including run-length decoding. The expanded prediction error signal conforms to the time series B, and hence is converted into the time series A by a scanning converter 581, and is then supplied via the line 5800.

In an adder circuit 584, the original motion vector is obtained from the expanded motion vector, i.e., from the differential motion vector by adding it in accordance with the time series A. This output is supplied to the line 5810.

In this embodiment, the motion vector produced by the motion vector detecting circuit 11 and represented in blocks (the time series B) can be alternatively supplied to the difference circuit 184. This is true because, the data of the motion vector are substantially the same but only differently arranged. Moreover, the motion vector may be directly subjected to variable length coding without employing differential circuit 184. Further, the motion vector is highly correlated to spatially close blocks such as the upper, lower, right and left blocks. Therefore, the coding efficiency can be further increased when the data are supplied to the differential circuit 184 after the rearrangement.

Figure 4:
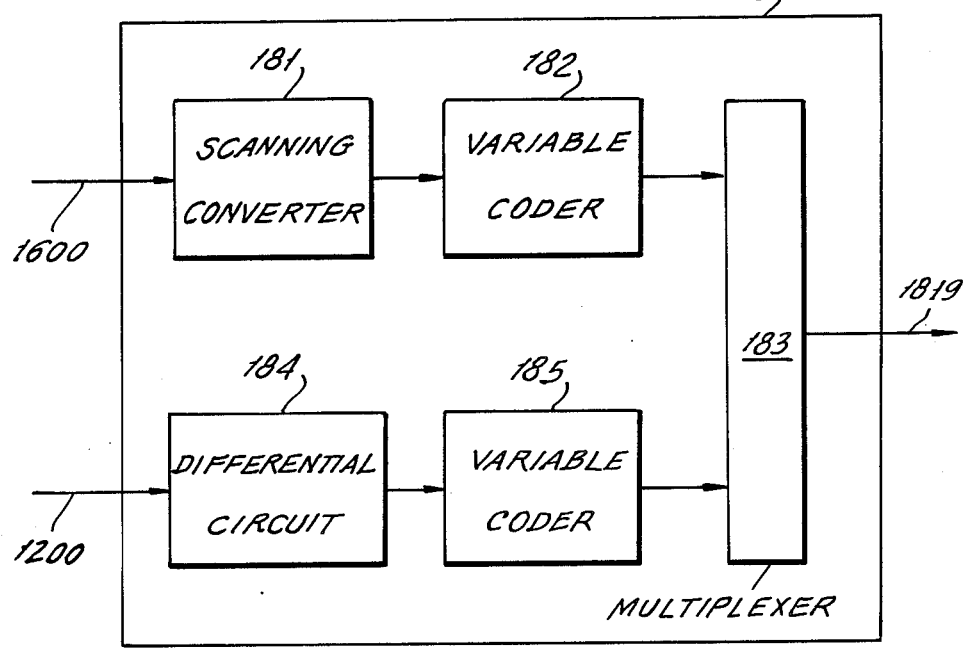
FIG. 4 is a diagram showing a compression coding circuit shown in FIG. 2.
Figure 5:
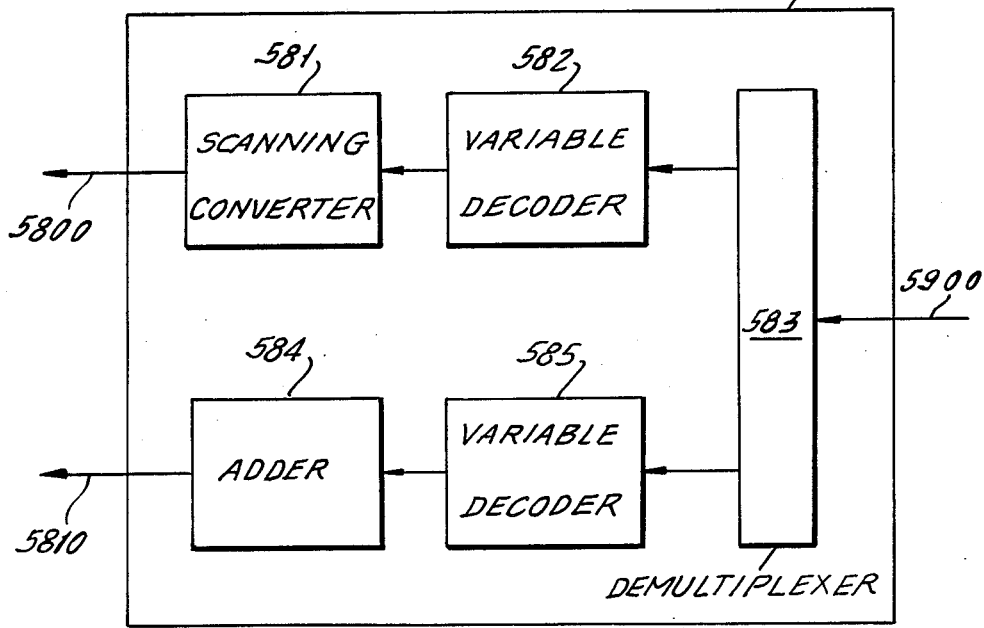
FIG. 5 is a diagram showing an expansion decoding circuit shown in FIG. 2.
Figure 6:
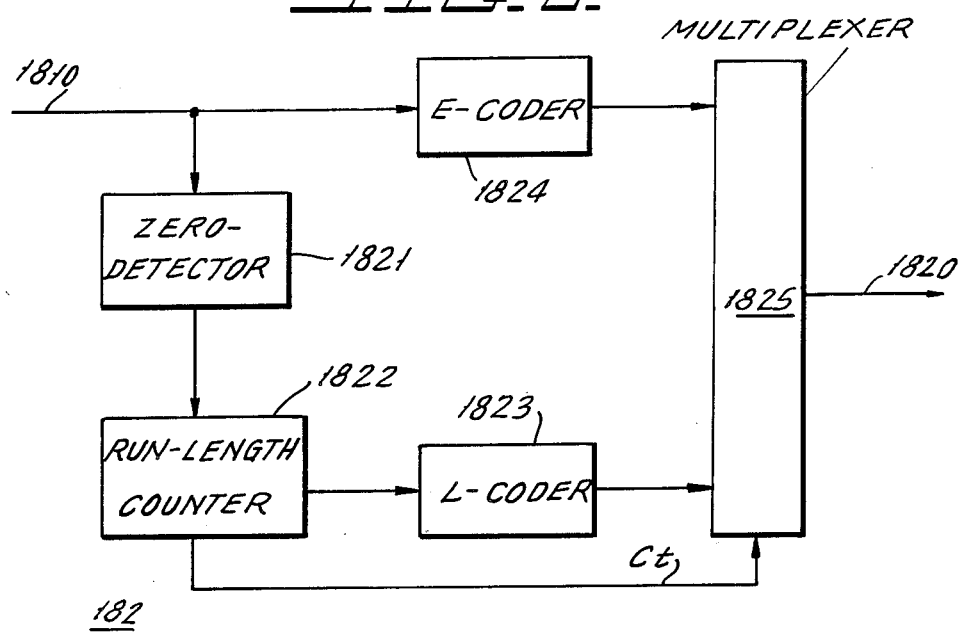
FIG. 6 is a block diagram of a variable length coder shown in FIG. 4.

FIG. 6 illustrates the construction of the variable length coder 182 of FIG. 4. The prediction error signal at line 1810 is supplied to a zero-detector 1821 and an E-coder 1824. The zero-detector 1821 detects whether or not the prediction error signal is zero, and transmits a detection signal to a run-length counter 1822 when the prediction error signal is zero. In this case, the detection signal is "0" when the error is zero, and is "1" when it is not zero. The run-length counter 1822 counts trains of zero, i.e., series of picture elements having zero in response to the detection signal, and supplies the counted result to an L-coder 1823. The L-coder 1823 codes the counted result (run-length) by using an efficient coding such as the Huffman code. On the other hand, E-coder 1824 codes the prediction error signal of non-zero values by using the Huffman code, for example, and supplies the coded result to a multiplexer 1825.

In the multiplexer 1825, the coded results delivered from the E-coder 1824 and the L-coder 1823 are selected and multiplexed in response to a control signal $C_t$ from the run-length counter 1822. The control signal $C_t$ designates the multiplexer 1825 to select the coded result from the L-coder 1823 after counting the run-length, to inhibit its operation during counting the run-length, and to select the coded result from the E-coder 1824 when the detection signal delivered from the zero-detector 1821 is "1". The output from the multiplexer 1825 is delivered at line 1820.

Figure 7:
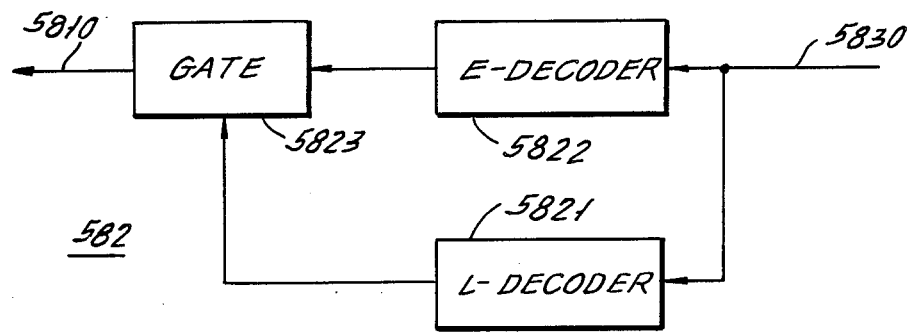
FIG. 7 is a block diagram of a variable length decoder shown in FIG. 5.

FIG. 7 illustrates the construction of the variable length decoder 582. The separated prediction error signal (coded data) delivered from the demultiplexer 583 (FIG. 5) is supplied to an L-decoder 5821 and an E-decoder 5822, where it is reversely decoded, respectively. When the coded data indicates a non-zero prediction error, the E-coder 5822 decodes the magnitude of the prediction error signal and supplies it to a gate 5823. Responsive to the coded data indicating the run-length, the L-decoder 5821 causes the gate to deliver an output of zero during the period corresponding to the run-length. Since a non-zero prediction error signal and the run-length are coded to be distinguishable from each other, the L-decoder 5821 and the E-coder 5822 can discriminate between them. As described above, the gate 5823 delivers the decoded prediction error signal to the scanning converter 581 (FIG. 5).

According to the present invention as explained above a higher efficiency coding with motion compensation, which detects the motion on a block basis, can be effectual based on the raster scanning which is the same as the ordinary scanning of the television signal. Therefore, a simple coding apparatus can be realized while a high coding efficiency is retained.

I claim:

1. A coding apparatus for encoding an input video signal, said apparatus comprising:

means for detecting motion contained in said input video signal and for generating motion vectors representative thereof, said motion being detected for each of several blocks into which a video picture frame associated with said input video signal is divided, said motion vectors being delivered in accordance with a time sequence associated with said blocks;

means for converting the time sequence of said motion vectors into converted motion vectors having a time sequence associated with said input video signal;

means for generating a prediction error signal in response to said input video signal and said converted motion vectors;

means for converting the time sequence of said prediction error signal into another time sequence to produce a converted prediction error signal; and means for coding said converted prediction error signal by a variable length coding scheme.

2. A coding apparatus as claimed in claim 1, in which said coding means includes means for coding said converted prediction error signal by a run-length coding scheme when said converted prediction error signal has zero values.

3. A coding/decoding apparatus for a video signal, said apparatus comprising:

means for detecting motion contained in an input video signal and for generating motion vectors, said motion being detected for each of several blocks into which a video picture frame associated with said input video signal is divided, said motion vectors being delivered in accordance with a time sequence associated with said blocks;

means for converting the time sequence of said motion vectors into converted motion vectors having a time sequence associated with said input video signal;

means for generating a prediction error signal in response to said input video signal and said converted motion vectors;

means for converting the time sequence of said prediction error signal into another time sequence to produce a converted prediction error signal;

means for coding said converted prediction error signal by a variable length coding scheme;

means for decoding the output of said coding means to produce a received prediction error signal;

means for converting a time sequence associated with said received prediction error signal into the time sequence of said input video signal to produce a received-converted prediction error signal; and means for reproducing a video signal in response to said received-converted prediction error signal and a converted motion vector.

4. A television video signal coding circuit comprising:

means for detecting motion contained in each of a plurality of block units into which a video signal is subdivided, and for producing motion vectors representative of said motion, said apparatus having a first timing sequence associated with the generation of picture elements in said video signal and a second timing sequence associated with the generation of said motion vectors;

means for converting the arrangement of said motion vectors from said second timing sequence to said first timing sequence;

means for generating a prediction error signal, said prediction error signal being dependent upon said video signal, an output of said converting means for said motion vectors, and an output which is related to a previous value of said prediction error signal;

means for rearranging said prediction error signal from said first timing sequence to said second time sequence;

means for encoding said rearranged prediction error signal in accordance with a variable length coding scheme; and means for transmitting said encoded prediction error signal and another signal which is representative of said motion vectors.

5. The apparatus of claim 4 wherein said apparatus further comprises a buffer memory for temporarily storing said coded prediction error signal and said output which is representative of said motion vectors and for transmitting said signals at a rate which is matched to a transmission medium transmission rate.

6. The apparatus of claim 4 wherein said means for converting said motion vectors from said second timing sequence to said first timing sequence comprises a scanning converter.

7. The apparatus of claim 4 wherein said motion detection means comprise a frame memory and a block memory which receives said video signal, said frame memory having a capacity to hold at least an amount of data which is sufficient to store said picture frame of said video signal, said block memory having a memory which is sufficient to store at least sufficient data which is equivalent to video data contained in at least two of said block units;

a variable delay circuit coupled to said frame memory to delay data received from said frame memory;

a control circuit for supplying trial vectors which produce addresses for said variable delay circuit;

a subtractor coupled to said variable delay circuit and said block memory for producing differences between data stored in said block memory and data delivered from said variable delay circuit;

an accumulator for accumulating said differences and a comparator for comparing accumulated results for each successive trial vector and for generating a switching signal; and an optimum vector determining circuit responsive to said control circuit and to said switching signal for selecting, on a temporary basis, an optimal vector which is associated with each of said block units.

8. The apparatus of claim 7 in which said coding means includes means for coding said converted prediction error signal in accordance with a run-length coding scheme whenever said converted prediction error signal has zero values.

9. The apparatus of claim 4 in which said coding means includes means for coding said converted prediction error signal in accordance with a run-length coding scheme whenever said converted prediction error signal has zero values.

10. The apparatus of claim 4 further comprising a decoding circuit for decoding said video signal transmitted from said encoding circuit.

11. The apparatus of claim 10 in which said decoding circuit comprises an expansion decoding circuit for decoding said prediction error signal which has been encoded by said means for coding said converted prediction error signal to reproduce said prediction error signal; and means for recovering said video signal in response to said signal which is related to said motion vectors from said encoding signal and said prediction error signal.

12. A coding apparatus for encoding an input video signal comprising:

means for detecting motion contained in said input video signal to produce motion vector signal representative thereof, said motion being detected for each of several blocks into which a video picture frame of said input video signal is divided, said motion vector signal being produced in accordance with a time sequence associated with said blocks;

means for converting the time sequence of said motion vector signal into a time sequence associated with said input video signal to produce a converted motion vector signal;

means responsive to said input video signal and said converted motion vector signal for generating a prediction error signal;

means for converting the time sequence of said prediction error signal into the time sequence of said motion vector signal produced by said detecting means to produce a converted prediction error signal;

means for coding said converted prediction error signal by a variable length coding scheme to produce a coded prediction error signal;

means for coding said motion vector signal by a variable length coding scheme to produce a coded motion vector signal; and means for multiplexing said coded prediction error signal and said coded motion vector signal.

13. A coding apparatus as claimed in claim 12, in which said converted prediction error signal coding means includes:

a first coder for coding said converted prediction error signal by a run-length coding scheme for zero values of said converted prediction error signal; and a second coder for coding said converted prediction error signal in accordance with a Huffman code scheme for nonzero values of said converted prediction error signal.

14. A coding apparatus as claimed in claim 12, in which said motion vector signal coding means includes a differential circuit for producing a difference signal between said motion vector signals which belong to neighboring blocks before being processed in accordance with said variable length coding and including means for processing said difference signal in accordance with said variable length coding.

* * * * *